Figure 1:
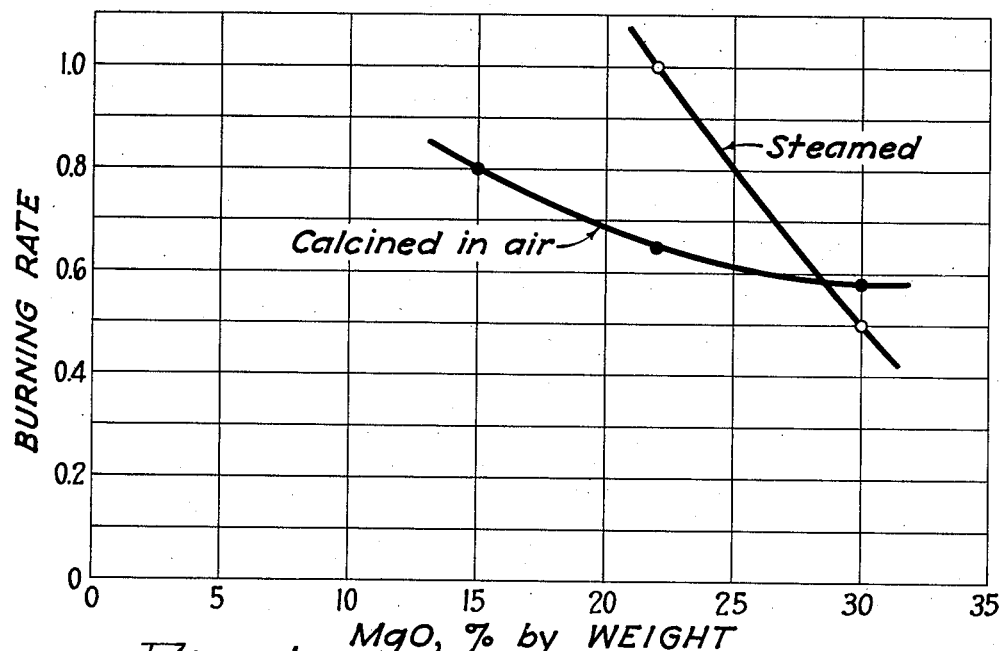

INVENTOR.
Glenn M. Webb

Patented July 29, 1952

2,605,237

UNITED STATES PATENT OFFICE 2,605,237

SILICA-MAGNESIA CATALYST FOR HYDROCARBON-OIL CONVERSION

Glenn M. Webb, Western Springs, Ill., assignor to Standard Oil Company, Chicago, Ill., a corporation of Indiana Application April 15, 1950, Serial No. 156,143

11 Claims. (Cl. 252—457)

This invention relates to the conversion of hydrocarbon oils, and more particularly to the cracking of gas oils and the reforming of gasoline and heavy naphtha for the manufacture of motor fuels of high anti-knock rating. More specifically, the invention relates to an improved silica-magnesia catalyst of stable activity and regenerability, and to a process employing said improved catalyst for the conversion of hydrocarbon oils.

Silica-magnesia catalysts are now well known in the petroleum art (see for example Thomas U. S. Patent 2,432,634), and have been found to have substantial advantages over the catalysts heretofore employed in the conversion of hydrocarbon oils. Especially in the cracking of gas oils, heavy naphthas, and the like, silica-magnesia has the outstanding advantages of high activity, favorable selectivity, and long life without serious diminution in activity. However, its activity is so high that serious difficulties are encountered when it is employed in fluidized-catalyst processes. In such processes, the range of permissible vapor velocities through the reactor is limited at the lower end by the necessity for maintaining fluidization, and at the upper end by the tendency of the catalyst powder to be blown out of the reactor. Within this range, excessive conversion and degradation of the charging stock may be encountered when an over-active catalyst is used, as for example in catalytic cracking of gas oils. Moreover, when silica-magnesia is used for cracking hydrocarbons and in other applications in which it becomes coated with carbon, it has the serious disadvantage that the longer it is used in such applications, the slower and more difficult is the burning of the deposited carbon therefrom, by which regeneration of the catalyst is customarily effected. Ultimately, in fact, regeneration temperatures are required which are feasible only in regenerator vessels constructed of expensive alloy steels, and regenerator contact times become so high that regenerator vessels of uneconomical sizes are required. Alternatively, where the regenerator is constructed of ordinary materials, withdrawals of the deactivated catalyst must be made at intervals and fresh catalyst must be supplied in order to maintain the regeneration rate thereof at a satisfactory level.

I have now produced a new type of silica-magnesia catalyst which has a somewhat lower activity than the prior-art silica-magnesia catalysts, and in addition is readily regenerated and retains its ease of regeneration over prolonged periods. My new catalyst consists essentially of less than around 25 percent by weight of MgO in the form of catalytically active magnesium silicate, the remainder being catalytically inactive silica; and it is prepared by commingling magnesia with a stoichiometric excess of reactive silica under conditions adapted to produce catalytically active magnesium silicate, believed to be $4SiO_2.3MgO.H_2O$, and treating the resulting mixture with steam, ammonia, or the like, under conditions effective for deactivating the excess silica present therein.

One object of my invention is to effect the conversion of hydrocarbon oils in a more efficient and economical manner. Another object is to produce a silica-magnesia catalyst of moderately high and sustained activity. A further object is to prolong the useful life of silica-magnesia catalysts. A still further object is to produce a silica-magnesia catalyst having sustained high regenerability. Other objects of my invention and its advantages over the prior art will be apparent from the specification and claims.

The observed difference in regenerability characteristics between the prior-art silica-magnesia catalysts and conventional silica-alumina catalysts is believed to be due to differences in the behavior of the pore structures thereof. Silica-alumina catalysts initially have an average pore size around 30 to 40 angstroms; but as the catalyst is used, and as the carbon deposited thereon is burned off in the regeneration process, the pores enlarge to an equilibrium average size around 150 angstroms, so that during the regeneration process oxygen has ready access even to the carbon deposited within the pores. Silica-magnesia catalysts, on the other hand, start with approximately the same average pore size (30 to 40 angstroms), but do not change substantially during use. As a result, any carbon deposited within the pores is difficult to remove by oxidation, and tends to build up therein. It will be understood, of course, that this explanation of the observed effect is advanced only as a credible hypothesis, and I do not wish to be bound thereby.

In an effort to overcome the poor regeneration characteristics of silica-magnesia catalysts, I prepared a number of different specimens thereof containing an excess of silica over the theoretical amount required to produce catalytically active magnesium silicate, which is believed to be a definite crystalline compound having the composition $4SiO_2.3MgO.H_2O$, which corresponds to a 31.9 percent by weight content of MgO. The silica was intended as a spacing agent to permit easier access of oxygen to any carbon deposited within the catalyst structure. Since uncombined silica is itself a catalyst having the undesirable effects of producing much gas and coke from hydrocarbons, I subjected the catalysts to calcination in an atmosphere of steam in order to deactivate the silica. This treatment had no effect on the active magnesium silicate. On testing these catalysts in the cracking of a Mid-Continent virgin gas oil, I found that the steamed catalysts containing less than 25 percent by weight of MgO exhibited more stable regeneration characteristics than any catalysts containing a higher percentage of MgO, and than catalysts containing less than 25 percent MgO that were calcined in air according to conventional procedures. In general, the lower the MgO content of the steamed catalysts containing less than 25 percent by weight of MgO, the higher was the carbon burning rate; and the steamed samples containing less than 25 percent by weight of MgO showed substantially more stable regenerability.

In the manufacture of my catalyst, I prefer to use forms of silica and magnesia which are chemically reactive at ordinary or somewhat elevated temperatures (as distinguished from crystalline or fused silica), optimally silica hydrogel and precipitated magnesium hydroxide. The silica and magnesia are mixed together in any convenient manner, and the mixture is washed substantially free of ionic impurities, such as Na, $SO_4$, and the like, to avoid adverse effects on the activity of the completed catalyst. The mixed oxides are subjected to conditions leading to the interaction of the oxides to form active magnesium silicate; for this purpose, water or steam should be present in or added to the mixture at some stage of the preparation. The resulting mixture of magnesium silicate and uncombined silica is dried, preferably at somewhat elevated temperatures within the range of 200 to 300° F. for 2 to 24 hours, and the uncombined silica is deactivated, preferably by calcining in an atmosphere of steam at 800 to 1400° F. for 2 to 24 hours. The catalyst can be formed into various shapes while wet, or after being dried it can be crushed or pulverized depending upon the type of use for which it is intended.

Numerous modifications can be made in the method used for preparing my catalyst, while retaining the essential features of limiting the MgO content to less than about 25 percent and effecting the deactivation of the uncombined silica. The silica can be prepared and utilized in the form of a hydrogel by adding a strong acid, such as sulfuric acid, hydrochloric acid, or the like, to an aqueous sodium silicate solution, such as water glass. Alternatively, any other form of chemically reactive silica can be used, such as a silica hydrosol, or silica xerogel pellets, granules, or powder obtained by drying a silica hydrogel or hydrosol and shaping or comminuting. The magnesia can be added in the form of a finely divided solid, such as calcined magnesite, preferably digested in water at an elevated temperature; or it can be added as magnesium hydroxide, either dry or in the form of a water slurry; or an aqueous solution of a magnesium salt, such as the sulfate, nitrate, chloride, or the like, can be commingled with the silica, and the magnesia can be precipitated by addition of ammonium hydroxide or other basic material. My catalyst should not contain any substantial proportion of alumina, since even relatively small proportions of catalytically active silica-alumina therein produce a substantial and undesirable modification of its properties to properties more closely approximating the properties of a silica-alumina catalyst.

In an especially advantageous embodiment of my invention, coprecipitated silica hydrosol and magnesia hydrosol are digested at 120 to 220° F. for 2 to 100 hours before being dried and further treated. The digestion is preferably carried out after the mixed hydrosols have been washed thoroughly to remove contaminating ions therefrom. The prior art discloses numerous procedures for washing catalysts, as for example in Thomas and Ahlberg U. S. Patent 2,229,353, page 2, beginning at line 49 of column 1 and ending at line 69 of column 2.

Various procedures are suitable for deactivating the uncombined silica present in my catalyst. I prefer to calcine the catalytic mixture at 800 to 1400° F. for 2 to 24 hours in an atmosphere of steam, optionally diluted with nitrogen, carbon dioxide, or other inert gas. An effective alternative method comprises digesting the mixed silica and magnesia for 2 to 24 hours at ordinary or elevated temperatures, preferably 120 to 300° F., with an aqueous solution of a mildly alkaline material such as ammonia or a water-soluble amine. In this method, I prefer to use aqueous ammonium hydroxide containing from about 5 to 28 percent by weight of $NH_3$.

My new catalyst composition can be defined as a silica-magnesia catalyst consisting essentially of catalytically active magnesium silicate and catalytically inactive silica, containing up to about 25 percent by weight of MgO, preferably 10 to 25 percent, and optimally 20 to 25 percent. The existence of an optimum MgO range arises out of the fact that the regeneration stability of the catalyst improves as the MgO content decreases, while the activity of the catalyst is simultaneously lowered.

My invention will be more fully understood from the following specific examples. The expressions "activity," "gas factor," and "carbon factor" used herein have the meaning defined by Shankland and Schmitkons in an article, "Determination of activity and selectivity of cracking catalyst," which appeared in volume 27 (III) of the Proceedings of the American Petroleum Institute, Twenty-seventh Annual Meeting, pages 57–77 (1947).

*Example I*

Water glass ("N-Brand," made by the Philadelphia Quartz Company) weighing 1740 grams and containing 28.7 percent by weight $SiO_2$ and 8.9 percent $Na_2O$ was diluted with water to 8.25 liters, and was acidified with 1.25 liters of aqueous 10 percent sulfuric acid. The firm silica hydrogel which was produced thereby was broken up with a paddle and was stirred thoroughly. The desired quantity of MgO in the form of calcined magnesite was slurried quickly in 1.5 liters of water and the slurry was poured into the silica hydrogel with vigorous stirring. For a 22 percent MgO catalyst, 142 grams of the calcined magnesite were used, and proportionate amounts were used for other MgO concentrations. The slurry was then filtered in a suction filter, and the solids were washed six times by successively slurrying with six-liter portions of water and filtering. After the third wash, 50 grams of ammonium sulfate were added to each portion of wash water to assist in the removal of sodium ions. The purified gel was then dried 24 hours at 300° F., ground to smaller than 100-mesh particles, and divided into two portions, one of which was calcined in air at 1000° F. for four hours according to the conventional practice, while the other was steamed at 1250° F. for 16 hours according to the method of my invention. The physical properties of the finished catalysts were found to be as follows:

| Final Treatment | MgO, weight-percent | Area, m.²/g. | Pore Vol., cc./g. | Pore Diameter | |
|---|---|---|---|---|---|
| | | | | Mean Å. | Most Prob. Å. |
| Calcining | 15 | 522 | 0.46 | 35 | 25 |
| | 22 | 480 | 0.34 | 28 | 18 |
| | 30 | 592 | 0.35 | 24 | 16 |
| Steaming | 15 | 324 | 0.38 | 47 | 37 |
| | 22 | 364 | 0.32 | 35 | 36 |
| | 30 | 463 | 0.32 | 27 | 18 |

From the data, it will be apparent that catalysts of low magnesia content undergo a relatively large decrease in surface area during steaming. This effect is believed to be due to the fact that such catalysts have a larger proportion of free silica, which originally has a high surface area, but which is deactivated and degraded during steaming, with a consequent loss in surface area. The means pore diameters of all the catalysts appear to increase during steaming, but the increase is much greater for the catalysts of low MgO content, for the same probable reason as the observed decrease in surface area. The tabulated increases in the "most probable" pore diameters of the steamed catalysts of low MgO content are of special interest, since the development of large pores is believed to be essential for desirable regeneration characteristics.

The finished catalysts were then tested by the method of Shankland and Schmitkons, referred to above, to measure their activity and selectivity in cracking a gas oil. The resulting carbon-coated catalysts were thereafter tested to determine their carbon-burning rates, as a measure of their regenerability. The tests were conducted on one-gram samples of the carbonized catalysts at 1050° F. with air as the oxygen source, and the rates are reported in the table below as grams of carbon burned per 100 seconds per 100 grams of catalyst at a carbon content of one percent. Additional quantities of the carbonized catalysts were subjected to an accelerated aging procedure by calcining in a nitrogen atmosphere at 1300° F. for 2 hours, and their carbon-burning rates were measured as before and are reported in the table below. The latter rates, I have found, correspond closely to the carbon-burning rates of catalysts that have been used for from 6 to 15 months in the cracking of gas oils. The burning rates of the carbonized fresh catalysts and of the aged catalysts therefore are together measures of the stability of the regenerability of the catalyst.

| Final Treatment | MgO, weight-percent | Activity | Gas Factor | Carbon Factor | Burning Rate | |
|---|---|---|---|---|---|---|
| | | | | | Fresh | Aged |
| Calcining | 15 | 11 | 1.2 | 1.8 | 0.80 | -------- |
| | 22 | 16 | 1.0 | 1.5 | 0.65 | 0.40 |
| | 30 | 54 | 1.5 | 1.2 | 0.58 | 0.26 |
| Steaming | 15 | 7 | 0.8 | 2.0 | -------- | -------- |
| | 22 | 10 | 1.1 | 1.7 | 1.00 | 0.66 |
| | 30 | 41 | 1.4 | 1.3 | 0.50 | 0.36 |

The effects of MgO concentration and steaming on burning rate are shown in Figure 1, from which it will be seen (1) that a reduction in MgO content leads to an initial improvement in burning rate, and (2) that steaming the otherwise finished catalyst improves the burning rate at MgO contents below about 25 percent by weight, but reduces the burning rate at MgO contents above about 25 percent.

*Example II*

"N-Brand" water glass weighing 1740 grams was converted into a silica hydrogel as described in Example I. Magnesium sulfate equivalent to the desired quantity of MgO was dissolved in 1.5 liters of water, and the resulting solution was stirred into the hydrogel. To the resulting mixture, ammonium hydroxide equivalent to the magnesium sulfate was added with agitation, the magnesia being precipitated thereby in the form of the hydroxide. For a 15 percent MgO catalyst, 538 grams of $MgSO_4 \cdot 7H_2O$ and 442 milliliters of aqueous 28 percent ammonium hydroxide were used, and proportionate amounts were used for other MgO concentrations. The resulting slurry was filtered in a suction filter, and the solids were washed, dried, and calcined in air or steam as described in Example I. The catalysts prepared in this way had the following physical properties:

| Final Treatment | MgO, weight-percent | Area, m.²/g. | Pore Vol., cc./g. | Pore Diameter | |
|---|---|---|---|---|---|
| | | | | Mean Å. | Most Prob. Å. |
| Calcining | 15 | 477 | 0.44 | 37 | 30 |
| | 22 | 533 | 0.36 | 27 | 18 |
| | 30 | 579 | 0.35 | 24 | 18 |
| Steaming | 15 | -------- | -------- | -------- | -------- |
| | 22 | 352 | 0.32 | 37 | 25 |
| | 30 | 416 | 0.31 | 30 | 25 |

The catalysts were subjected to activity, selectivity, and carbon-burning tests as described in Example I, with the following results:

| Final Treatment | MgO, weight-percent | Na, weight-percent | Activity | Gas Factor | Carbon Factor | Burning Rate | |
|---|---|---|---|---|---|---|---|
| | | | | | | Fresh | Aged |
| Calcining | 15 | 0.2 | 15 | 1.5 | 1.7 | 0.80 | 0.56 |
| | 22 | 0.4 | 37 | 1.0 | 1.2 | 0.46 | 0.27 |
| | 30 | 0.2 | 82 | 0.8 | 0.7 | 0.48 | 0.25 |
| Steaming | 15 | 0.2 | 4 | 0.8 | 2.9 | -------- | -------- |
| | 22 | 0.4 | 20 | 1.2 | 1.0 | 0.64 | 0.37 |
| | 30 | 0.2 | 57 | 0.9 | 0.6 | 0.37 | 0.30 |

Figure 2:
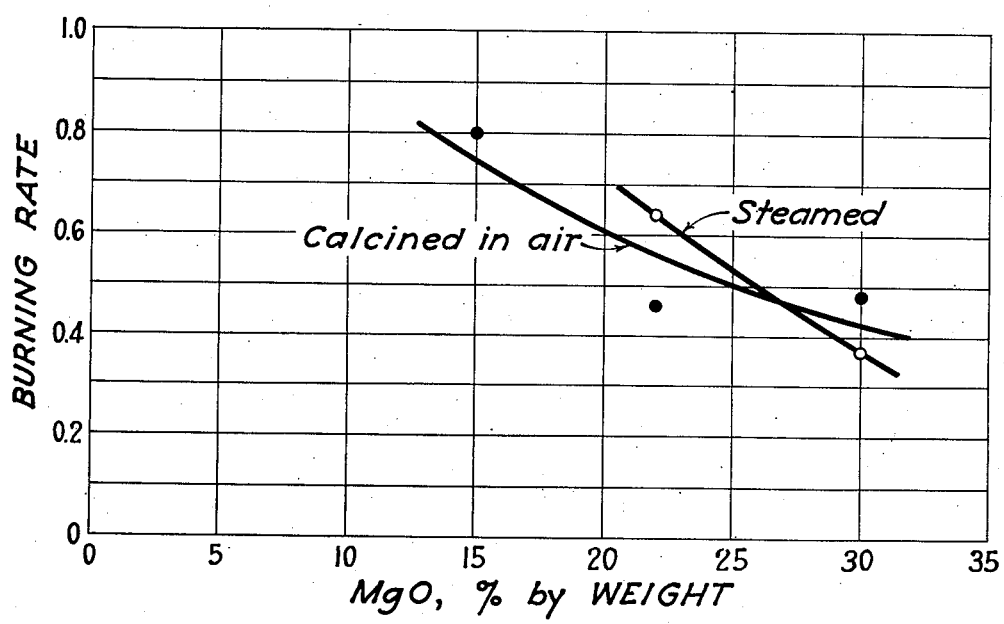

The effects of MgO concentration and steaming on burning rate are shown in Figure 2, from which it will be seen that catalysts prepared from magnesium sulfate have substantially the same properties as comparable catalysts prepared from finely divided solid magnesia.

My catalyst is useful in numerous processes for converting hydrocarbon oils. It is highly effective, for example, for cracking petroleum oils, such as gas oils, heavy naphthas, and the like, at temperatures in the range of about 800 to 950° F. and pressures ordinarily between about 1 and 5 atmospheres, absolute. My catalyst is also suitable for reforming gasolines to improve their antiknock rating, such treatment being ordinarily carried out at temperatures between about 900 and 1025° F., pressures between about 5 to 25 atmospheres, absolute, and liquid space velocities between about 0.1 and 2 per hour, in the presence of hydrogen. Other applications will be apparent from the prior art.

My catalyst can be used to advantage in any existing catalytic treating units, whether of the fixed-bed, moving-bed, or fluidized type. It is of particular utility where it is desirable to use a silica-magnesia catalyst in a plant employing the fluidized-catalyst technique and having regenerators designed for use with less-active catalysts.

While I have described my invention with respect to certain specific embodiments thereof, it is to be understood that I am not limited thereto. In general, it can be said that any modifications or equivalents that would ordinarily occur to one skilled in the art are to be considered as lying within the scope of my invention.

In accordance with the foregoing description, I claim as my invention:

1. In a method for preparing an improved silica-magnesia catalyst of stable activity and regenerability in the conversion of hydrocarbon oils, said catalyst consisting essentially of a homogeneous, porous mixture of catalytically inactive silica with between about 10 and 25 percent by weight MgO, dry basis, in the form of catalytically active magnesium silicate, the steps which comprise intimately mixing a magnesia-affording substance with a reactive form of silica, converting said mixture into magnesium silicate and free silica, drying the resulting mixture, and deactivating uncombined silica contained therein.

2. In a method for preparing an improved silica-magnesia catalyst of stable activity and regenerability in the conversion of hydrocarbon oils, said catalyst consisting essentially of a homogeneous, porous mixture of catalytically inactive silica with between about 10 and 25 percent by weight MgO, dry basis, in the form of catalytically active magnesium silicate, the steps which comprise intimately mixing finely divided magnesia with silica hydrosol, gelling and drying the resulting mixture, and deactivating the uncombined silica contained therein.

3. In a method for preparing an improved silica-magnesia catalyst of stable activity and regenerability in the conversion of hydrocarbon oils, said catalyst consisting essentially of a homogeneous, porous mixture of catalytically inactive silica with between about 10 and 25 percent by weight MgO, dry basis, in the form of catalytically active magnesium silicate, the steps which comprise intimately mixing calcined magnesite with silica hydrogel, drying the resulting mixture, and deactivating uncombined silica contained therein.

4. In a method for preparing an improved silica-magnesia catalyst of stable activity and regenerability in the conversion of hydrocarbon oils, said catalyst consisting essentially of a homogeneous, porous mixture of catalytically inactive silica with between about 10 and 25 percent by weight MgO, dry basis, in the form of catalytically active magnesium silicate, the steps which comprise intimately mixing precipitated magnesia with silica gel in wetted condition, drying the resulting mixture, and deactivating uncombined silica contained therein.

5. In a method for preparing an improved silica-magnesia catalyst of stable activity and regenerability in the conversion of hydrocarbon oils, said catalyst consisting essentially of a homogeneous, porous mixture of catalytically inactive silica with between about 10 and 25 percent by weight MgO, dry basis, in the form of catalytically active magnesium silicate, the steps which comprise intimately mixing precipitated magnesia with silica hydrogel, digesting the resulting mixture at 120 to 300° F. for 2 to 100 hours in the substantial absence of contaminating ions, drying the resulting mixture, and deactivating uncombined silica contained therein.

6. In a method for preparing an improved silica-magnesia catalyst of stable activity and regenerability in the conversion of hydrocarbon oils, said catalyst consisting essentially of a homogeneous, porous mixture of catalytically inactive silica with between about 10 and 25 percent by weight MgO, dry basis, in the form of catalytically active magnesium silicate, the steps which comprise precipitating magnesium hydroxide in a silica hydrogel, drying the resulting mixture, and deactivating uncombined silica contained therein.

7. In a method for preparing an improved silica-magnesia catalyst of stable activity and regenerability in the conversion of hydrocarbon oils, said catalyst consisting essentially of a homogeneous, porous mixture of catalytically inactive silica with between about 10 and 25 percent by weight MgO, dry basis, in the form of catalytically active magnesium silicate, the steps which comprise intimately mixing finely divided magnesia with silica hydrogel, drying the resulting mixture, and steaming the dry mixture at a temperature between about 800 and 1400° F. for 2 to 24 hours, whereby uncombined silica contained therein is converted into a catalytically inactive form.

8. In a method for preparing an improved silica-magnesia catalyst of stable activity and regenerability in the conversion of hydrocarbon oils, said catalyst consisting essentially of a homogeneous, porous mixture of catalytically inactive silica with between about 10 and 25 percent by weight MgO, dry basis, in the form of catalytically active magnesium silicate, the steps which comprise intimately mixing finely divided magnesia with silica hydrogel, drying the resulting mixture, treating the dried mixture with aqueous ammonium hydroxide at a temperature between about 120 and 300° F. for 2 to 100 hours, whereby uncombined silica contained therein is converted into a catalytically inactive form, and drying the treated mixture.

9. An improved silica-magnesia catalyst of stable activity and regenerability in the conversion of hydrocarbon oils, said catalyst consisting essentially of a homogeneous, porous mixture of catalytically inactive silica with up to about 25 percent by weight MgO, dry basis, in the form of catalytically active magnesium silicate.

10. An improved silica-magnesia catalyst of stable activity and regenerability in the conversion of hydrocarbon oils, said catalyst consisting essentially of a homogeneous, porous mixture of catalytically inactive silica with between about 10 and 25 percent by weight MgO, dry basis, in the form of catalytically active magnesium silicate.

11. An improved silica-magnesia catalyst of stable activity and regenerability in the conversion of hydrocarbon oils, said catalyst consisting essentially of a homogeneous, porous mixture of catalytically inactive silica with between about 20 and 25 percent by weight MgO, dry basis, in the form of catalytically active magnesium silicate.

GLENN M. WEBB.

REFERENCES CITED

The following references are of record in the file of this patent:

UNITED STATES PATENTS

| Number | Name | Date |
|---|---|---|
| 2,323,728 | Ruthruff | July 6, 1943 |
| 2,343,295 | Bailie et al. | Mar. 7, 1944 |
| 2,390,556 | Ruthruff | Dec. 11, 1945 |